(12) United States Patent
Coscarella

(10) Patent No.: US 8,453,666 B2
(45) Date of Patent: Jun. 4, 2013

(54) SEAL FOR PRESSURE TESTING A PLUMBING INSTALLATION AND METHOD OF USE THEREOF

(76) Inventor: Gabe Coscarella, Edmonton (CA)

( * ) Notice: Subject to any disclaimer, the term of this patent is extended or adjusted under 35 U.S.C. 154(b) by 967 days.

(21) Appl. No.: 12/474,187

(22) Filed: May 28, 2009

(65) Prior Publication Data
US 2009/0295101 A1    Dec. 3, 2009

(30) Foreign Application Priority Data
May 29, 2008 (CA) .................................... 2633165

(51) Int. Cl.
B08B 7/00 (2006.01)
(52) U.S. Cl.
USPC ........ 137/15.01; 137/68.11; 73/49.8; 138/89; 138/90

(58) Field of Classification Search
USPC ................... 137/68.19, 68.11, 15.01; 138/90, 138/89; 73/49.8
See application file for complete search history.

(56) References Cited

U.S. PATENT DOCUMENTS 4,936,350 A * 6/1990 Huber ............................. 138/90
7,481,096 B2 * 1/2009 Brock ............................. 138/90

* cited by examiner

Primary Examiner — Kevin Lee
Assistant Examiner — Macade Brown
(74) Attorney, Agent, or Firm — Christensen O'Connor Johnson Kindness PLLC

(57) ABSTRACT

A method for testing the integrity of a plumbing system. A first step involves affixing a seal with a releasable adhesive over a component of the plumbing system having a bore to occlude the bore. A second step involves charging the plumbing system with a fluid.

13 Claims, 4 Drawing Sheets

SEAL FOR PRESSURE TESTING A PLUMBING INSTALLATION AND METHOD OF USE THEREOF

FIELD

The technology relates to a seal and method for assessing integrity of a plumbing system. More specifically, the technology is a low cost resilient, releasable sealing seal.

BACKGROUND

During the final stages of plumbing, a test must be conducted to ensure the integrity of the plumbing system. This requires charging the system such that it becomes pressurized, during which time the plumber looks for leaks. The system must be closed in order to make the assessment. Once the integrity is assured, the means for plugging the system is removed.

What is required is a simple, inexpensive seal that can withstand the pressures needed to test plumbing installations, while being readily removable after the testing is completed.

SUMMARY

According to one aspect there is provided a method for testing the integrity of a plumbing system. A first step involves affixing a seal with a releasable adhesive to a component of the plumbing system having a bore to occlude the bore. A second step involves charging the plumbing system with a fluid.

According to another aspect there is provided a releasable seal that can be affixed to a component of a plumbing system, whether to a plumbing fitting, at the end of a pipe, along the length of the pipe, etc. to permit testing for leakages in the plumbing system.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
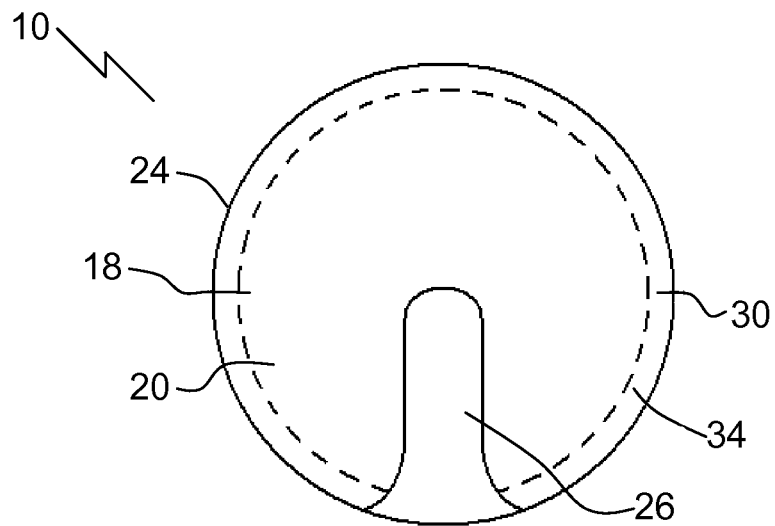
FIG. 1 is a front plan view of a seal for testing the integrity of a plumbing installation.
Figure 2:
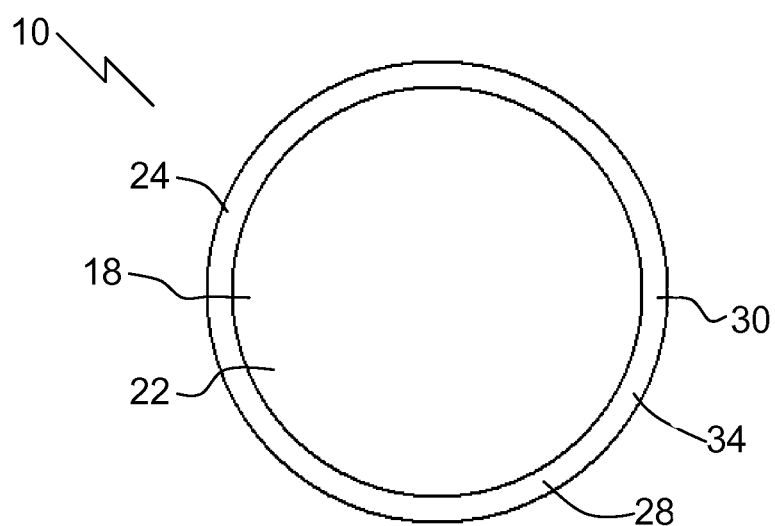
FIG. 2 is a rear plan view of the seal of FIG. 1.
Figure 3:
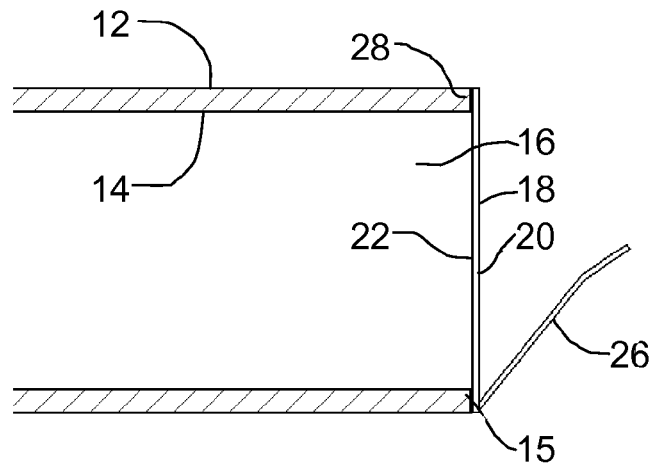
FIG. 3 is a side elevation view in section of the seal of FIG. 1 installed on a pipe.

A seal, generally referred to as 10, is shown in FIGS. 1 and 2. The seal 10 has a body 18 with having a front face 20, a back face 22, a perimeter 24, and a tab 26 extending from the body 18 on the front face 20. The tab 26 may be integral or may be a separate component that is attached to the body 18. The tab 26 is preferably connected to the perimeter 24 of body 18. The body 18 is at least resistant, if not impermeable, to the fluid to be used for testing purposes, such as water, air, gas, etc. An adhesive 28 is disposed on body 18 to secure it to a component of a plumbing system. For convenience, a plumbing pipe 12 is used in the description below and in the drawings. However, it will be understood that body 18 may also be secured to other suitable components with a bore, such as plumbing fittings (not shown), and that in other embodiments, plumbing pipe 12 may be replaced by these other components. As shown in FIG. 2, the adhesive 28 is applied to a periphery 30 of the back face 22 which is intended to contact a plumbing pipe 12, as shown in FIG. 3. For clarity, the term periphery is used to include any outer portion of body 18 intended to contact plumbing pipe 12, and includes at least one of the peripheral region on the back face 22, the peripheral region of a peripheral annulus portion 34 of the back face 22 and the perimeter of the peripheral annulus 34. For storage and transportation prior to use, adhesive 28 may be covered by a tear-away or peel-away strip (not shown). Alternatively, adhesive 28 and body 18 may be stored separately, with adhesive 28 being applied to body 18 immediately prior to use, or adhesive may be activated by applying, for example, water or other substances.

Figure 4:
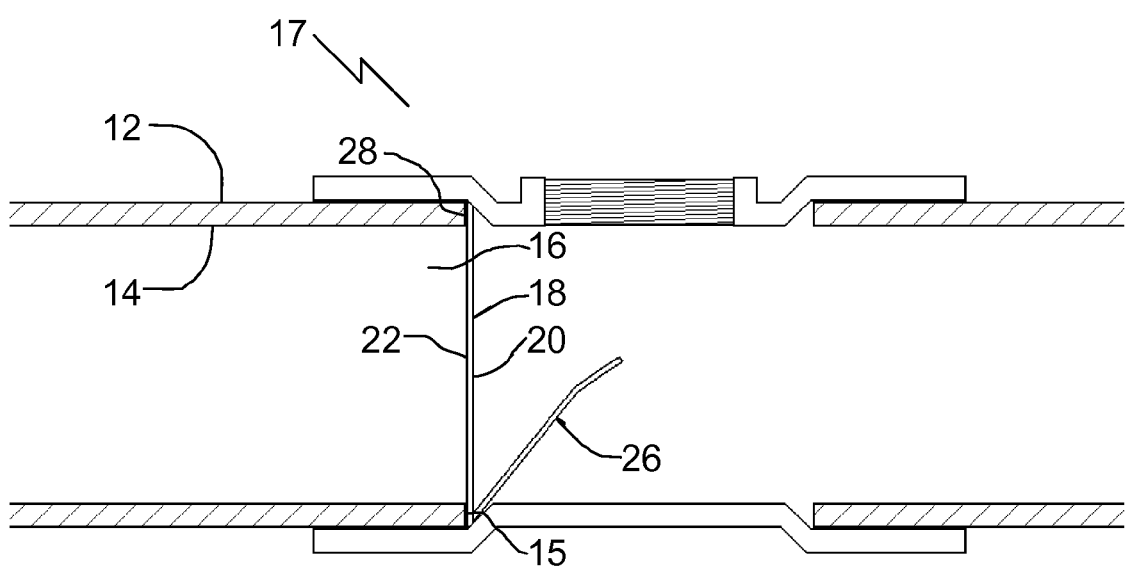
FIG. 4 is a side elevation view in section of the seal of FIG. 1 installed in a plumbing installation.
Figure 5:
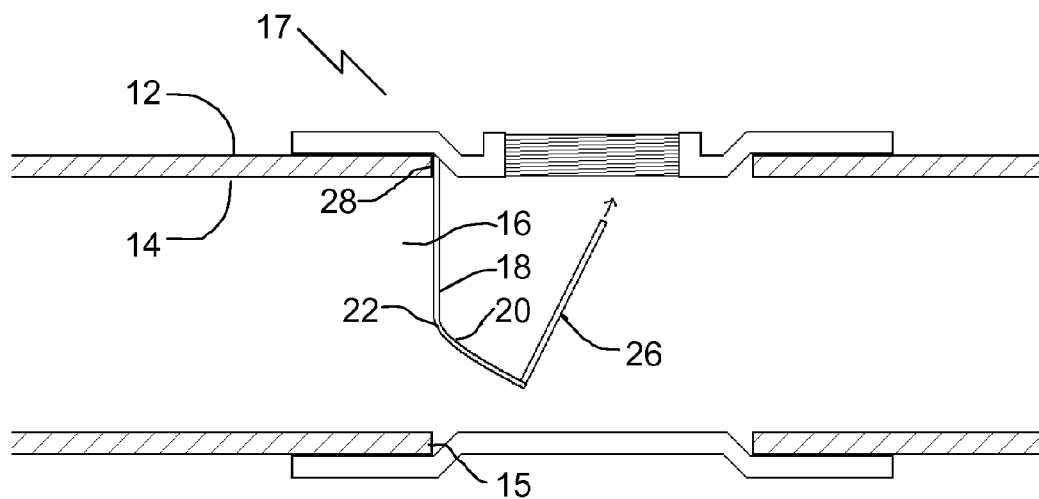
FIG. 5 is a side elevation view in section of the seal partially removed.

In use, referring to FIG. 3 the body 18 of seal 10 is placed over a plumbing pipe 12 that has an inner wall 14, an end 15 and a bore 16. The seal 10 is positioned such that the adhesive 28 contacts the end 15 of the plumbing pipe 12, to cover the bore 16. Pressure or heat is applied to cause the adhesive 28 to adhere to the end of the plumbing pipe 12. Referring to FIG. 4, plumbing pipe 12 is then installed in a plumbing system, generally indicated by reference numeral 17. Once secured, the system 17 is charged with fluid such as a gas, such as air, a liquid, such as water, or a mixture of fluids until the desired pressure is reached. The integrity of the plumbing can then be assessed. Referring to FIG. 5, the seal 10 may be removed once testing has been completed by pulling on the tab 26. The adhesive 28 may be designed to withstand pressures of between about 5 psi to about 15 psi for some plumbing systems, and to release when a force is applied to the tab 26 by a user. This may be done by having a breakaway pressure that is greater than the maximum test pressure, or by providing an adhesive with a lower shear strength, such that pulling at an angle causes the adhesive to pull away from end 15 of pipe 12. In one embodiment, the tab 26 is preferably adjacent to the adhesive 28 on an opposite face to more efficiently transfer the force necessary to release the adhesive 28. Other designs for a tab 26 that allows the adhesive 28 to be released will be apparent to those skilled in the art.

Figure 6:
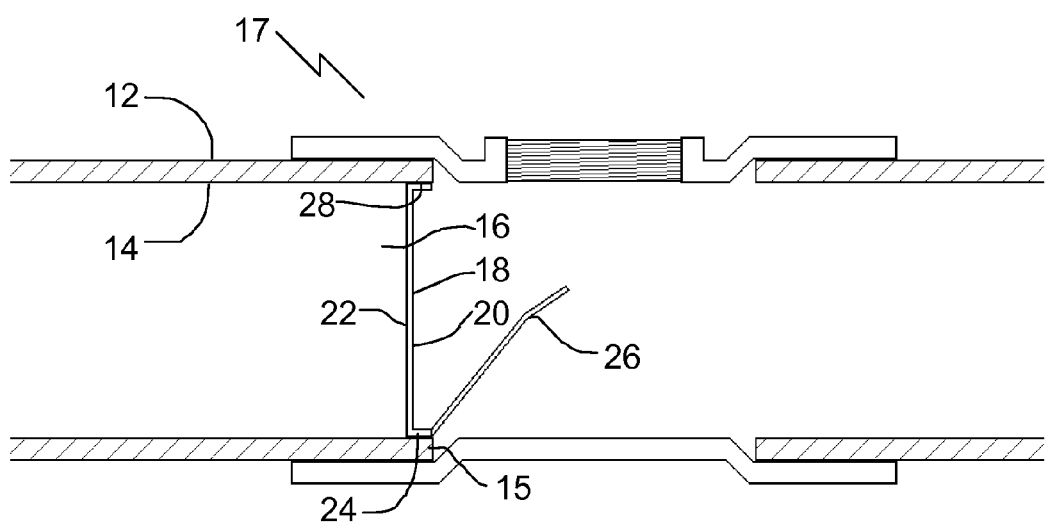
FIG. 6 is a side elevation view in section of an alternative embodiment of the seal.

If the end 15 of the plumbing pipe 12 is not accessible, the seal 10 may also be placed as shown in FIG. 6. Preferably, the seal 10 is pre-creased, or otherwise provided with a lip 38 extending at about right angle to the front face 20 to assist in positioning the adhesive 28, such that it contacts the inner wall 14 of the plumbing pipe 12, covering the bore 16. Once in place, pressure or heat is applied to cause the adhesive to adhere to the inner wall 14 of the plumbing pipe 12. Once secured, the system is charged with fluid, for example a gas, such as air, a liquid, such as water, or a mixture of fluids until the desired pressure is reached. The integrity of the plumbing can then be assessed. At any time after the integrity of the system has been assessed, the seal 10 is removed by pulling on the tab 26 as discussed previously.

Figure 7:
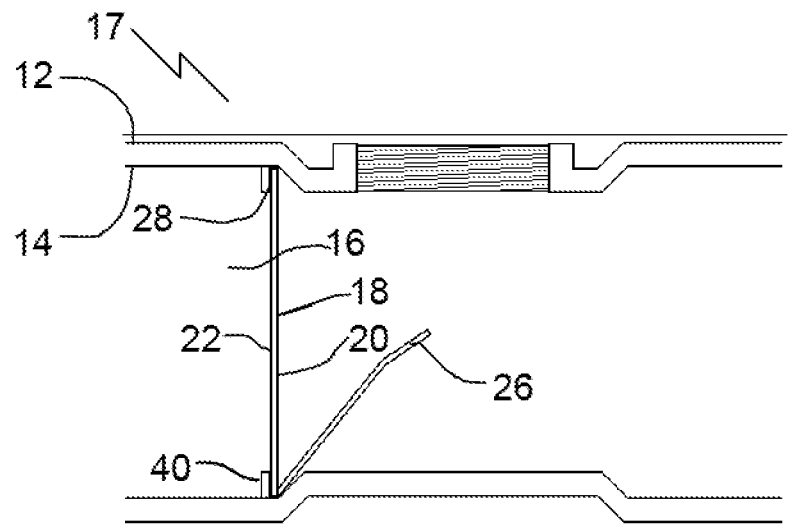
FIG. 7 is a side elevation view in section of a further alternative embodiment of the seal.

Alternatively, referring to FIG. 7, if the end 15 of the plumbing pipe 12 is not accessible, such as if pipe 12 is integrally formed with system 17 such that there is not an end 15, a flange 40 may be employed. Body 12 is secured to flange 40 by applying pressure or heat to cause the adhesive 28 to adhere to flange 40. The flange 40 is then positioned on the inner wall 14 of the plumbing pipe 12. A pipe 12 (not shown) is then welded into system 17, and the pipe is secured to flange 40, such as by using the same solvent that secures pipe 12 into system 17. Once secured, the system is charged with a gas, a mixture of gases or a fluid, most commonly water until the desired pressure is reached. The integrity of the plumbing can then be assessed. At any time after the integrity of the system has been assessed, the seal 10 is removed by pulling on the tab 26 as discussed previously.

Figure 8:
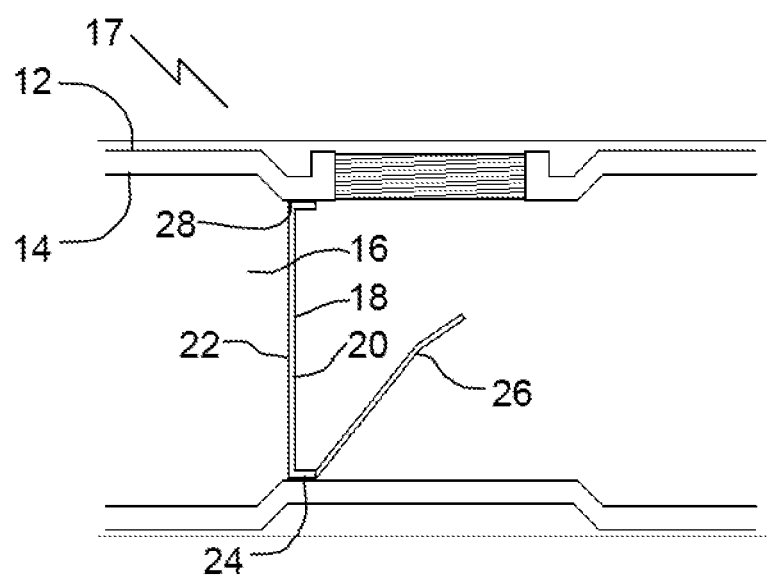
FIG. 8 is a side elevation view in section of a further alternative embodiment of the seal.

Alternatively, referring to FIG. 8, a seal 10 similar to that depicted in FIG. 6 may be used, where adhesive 28 is positioned on periphery 24 of body 12, which is bent to form a sidewall-type structure.

The foregoing is a description of embodiments of the technology. As would be known to one skilled in the art, variations that do not change the scope of the invention are contemplated. For example, the seal body may be made of any suitable material that is able to withstand the pressure, as well as to be impervious to water and air, or at least impervious enough to permit testing of the plumbing system, for example, but not limited to, various plastic polymers, laminates, plasticized or waxed paper products, metal. The adhesive must be able to withstand the pressure exerted on the inner wall of the body, while at the same time, be selected to permit a user to pull the body away from the pipe. The adhesive is preferably water insoluble, however, sparingly soluble adhesives could be employed. The tab can be any sort of pull tab, as would be known to one skilled in the art and may range in shape from a defined tab to an extension of the perimeter, for example in the general shape of a triangle. The adhesive may become adhesive by exposing it to heat or chemicals, for example. In these instances, a tear-away would not be needed.

What is claimed is:

1. A method for testing the integrity of a plumbing system, the method comprising the steps of:
    affixing a seal with a releasable adhesive to a component of the plumbing system having a bore to occlude the bore, the seal having a pull tab;
    charging the plumbing system with a fluid; and
    applying a force to the pull tab, the force being sufficient to release the seal by releasing the adhesive.

2. The method of claim 1, wherein the step of charging the plumbing system with a fluid results in pressurizing the plumbing system to between about 5 psi to about 15 psi.

3. The method of claim 1, wherein the step of charging the plumbing system is performed with one of water, air or inert gas.

4. The method of claim 1, wherein the component of the plumbing system is a pipe or a fitting.

5. For use in testing plumbing system integrity, a seal, the seal comprising:
    a gas and water resistant body having a perimeter, a periphery, a front face, and a back face;
    an adhesive on at least the periphery of the back face; and
    a tab extending from the perimeter or front face, such that in use, the body is releasably affixed to occlude a bore of a component of a plumbing system, the adhesive being selected to release when a predetermined force is applied to the tab by a user.

6. The seal of claim 5, wherein the adhesive can withstand a pressure of between about 5 psi to about 15 psi.

7. The seal of claim 5, wherein the body is comprised of a metal, a plastic polymer, or combination thereof.

8. The seal of claim 5, wherein the body has a sealing ring on the back face and the adhesive is positioned on the sealing ring.

9. The seal of claim 8, wherein the body and the sealing ring are separate, and are secured by adhesive.

10. The seal of claim 7, wherein the component of the plumbing system is a pipe or a fitting.

11. A combination for use in testing plumbing system integrity, comprising:
    a seal, the seal comprising:
    a gas and water impermeable body, having a perimeter, a periphery, a front face and a back face;
    a tab extending from the perimeter or front face;
    an adhesive on at least the periphery of the back face or on the perimeter; and
    a component of a plumbing system having a bore therethrough, wherein the seal is releasably affixed to an inner wall or end wall of the component of the plumbing system with the adhesive, the seal covering the bore, thereby releasably occluding the bore, the adhesive being selected to release upon application of a predetermined force to the tab.

12. The combination of claim 11, wherein the adhesive can withstand a pressure of between about 5 psi to about 15 psi and yet release when the predetermined force is applied to the tab by a user.

13. The combination of claim 11, wherein the component of the plumbing system is a pipe or a fitting.

* * * * *